(12) United States Patent
Liu et al.

(10) Patent No.: US 7,275,242 B2
(45) Date of Patent: *Sep. 25, 2007

(54) SYSTEM AND METHOD FOR OPTIMIZING A PROGRAM

(75) Inventors: Shin-Ming Liu, Saratoga, CA (US); Dmitry Mikulin, San Mateo, CA (US); Muralitharan Vijayasundaram, Santa Clara, CA (US); David Xinliang Li, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

This patent is subject to a terminal disclaimer.

(21) Appl. No.: 10/264,681

(22) Filed: Oct. 4, 2002

(65) Prior Publication Data

US 2004/0068719 A1 Apr. 8, 2004

(51) Int. Cl.
*G06F 9/45* (2006.01)
(52) U.S. Cl. ............ 717/154; 717/152; 717/159
(58) Field of Classification Search ............ 717/154
See application file for complete search history.

(56) References Cited

U.S. PATENT DOCUMENTS

| | | | | |
|---|---|---|---|---|
| 5,283,901 A | * | 2/1994 | Masuyama ............ | 717/156 |
| 5,768,595 A | * | 6/1998 | Gillies ............ | 717/145 |
| 5,812,855 A | * | 9/1998 | Hiranandani et al. ..... | 717/157 |
| 5,850,549 A | * | 12/1998 | Blainey et al. ............ | 717/156 |
| 5,923,882 A | * | 7/1999 | Ho et al. ............ | 717/147 |
| 6,173,444 B1 | * | 1/2001 | Archambault ............ | 717/159 |
| 6,219,834 B1 | * | 4/2001 | Soroker et al. ............ | 717/145 |
| 6,820,253 B1 | * | 11/2004 | Robison ............ | 717/141 |

OTHER PUBLICATIONS

Chow et al. "How Many Addressing Modes are Enough?" Proceedings of the Second International Conference on Architectural Support for Programming Languages and Operating Systems (Oct. 1987), pp. 117-121.*
"Intel® Itanium™ Processor-specific Application Binary Interface (ABI)" (May 2001). Retrieved on Nov. 29, 2005 from <http://www.intel.com/design/itanium/downloads/24537003.pdf>. Intel Document No. 245370-003.*
"Itanium™ Software Conventions and Runtime Architecture Guide" (May 2001). Retrieved on Nov. 29, 2005 from <http://www.intel.com/design/itanium/downloads/24535803.pdf>. Intel Document No. 245358-003.*

* cited by examiner

*Primary Examiner*—Tuan Dam
*Assistant Examiner*—Michael J Yigdall

(57) ABSTRACT

The present disclosure relates to whole program analysis and, more particularly, short data optimization obtained through whole program analysis. In one embodiment, short data optimization is achieved by analyzing the program to estimate the size of existing short data and the size of any linkage tables, providing the size estimates to a compiler that is to compile the program, and compiling the program with the compiler in view of the size estimates such that a relatively large amount of data is allocated to a short data area.

17 Claims, 7 Drawing Sheets

SYSTEM AND METHOD FOR OPTIMIZING A PROGRAM

BACKGROUND

Whole program analysis enables an aggressive form of optimization that is applied on a full program basis. The goal of whole program analysis is to analyze substantially the entire program during the compilation phase to obtain the most effective optimization possible. One difficulty with whole program analysis is that the compiler used to compile the program normally does not have access to the entire program and, therefore, all of the information it needs to optimize the program. Instead, the compiler typically only "sees" the program files that are provided to the compiler by the programmer (i.e., user). Accordingly, the compiler normally cannot take into account any information contained in, for example, previously compiled object files of a library or a separate load module. Without having access to this information, the compiler cannot identify all the different relationships between the various portions of the program, and therefore cannot perform the most efficient optimization. Hence, optimization can only be provided in relation to the information gleaned from the source files provided to the compiler for compilation as opposed to the whole program.

One specific type of optimization that can be performed is short data optimization. As is known in the art, the compiler designates the global program data as either short data or long data. Short data have shorter addressing sequences and therefore can be accessed by a processor more directly during program execution. Long data, on the other hand, can only be accessed by first referring to a data linkage table stored in the short data area to obtain the address of the long data within the long data area. Accordingly, accessing long data involves an extra indirection that slows program execution. In view of this fact, it is desirable to designate as much data as possible as short data to increase execution speed.

Although greater performance can be obtained by placing more data in the short data area, there are limitations as to how much data can be designated as short data that are imposed by any given system architecture. In particular, the data references are encoded in program instructions using offsets. Because there is a limited number of bits that may be used to encode the offsets, if information regarding the location of a given piece of data requires more bits than are available for a single instruction (e.g., 32 bit instruction), multiple instructions are required to refer to the given data, thereby reducing program performance by requiring execution of more instructions. Therefore, to avoid this situation, an indirection is used to identify the location of the sought data. The size limitations of the short data area translate into a limited amount of data that may be designated as short data. By way of example, only 4 megabytes (MB) of data may be allocated to the short data area without overflowing the short data area and generating a link-time error.

In conventional systems, short data area overflow is normally avoided by arbitrarily designating all data having size below a given threshold as short data. For example, any piece of data equal to or less than 8 bytes may be designated as short data and allocated to the short data area. Although this approach typically is effective in avoiding exceeding the constraints of the short data area, it often results in underutilization of the available short data area, i.e., results in less data being designated as short data than is possible. By way of example, this approach may only result in approximately 1 MB of short data. This, in turn, results in more data being designated as long data and therefore slows execution of the compiled program. To more effectively utilize the short data area, the whole program must be considered. In particular, the sizes of each piece of data of the program, as well as the size of any tables to be stored within the short data area, must be considered.

In recognition of the limited amount of optimization that is obtainable using conventional techniques, several solutions have been proposed. In one such solution, aggressive assumptions are made as to the nature of the program that is to be compiled and are applied by the compiler during the compilation process. The problem with this approach, however, is that it is only as accurate as the assumptions that are made. Accordingly, if the assumptions are wrong, the program may not be optimized to its greatest extent or, in some cases, compilation errors will be encountered.

In another solution, attempts are made to approximate whole program analysis by creating a database for various libraries that contain object files. The compiler is configured to query the database for information about the object files and, presumably, uses this information to optimize the program. This approach fails to provide true whole program analysis, however, in that the database is built when the various program libraries are built and therefore can only provide information as to known system libraries. Accordingly, the approach is ineffective for gathering information contained in user provided libraries. Moreover, problems exist with regard to how to build the database and keep it up to date.

With particular regard to short data optimization, trial and error may be used by arbitrarily designating all data of a given size as short data. However, this approach is inefficient in that several attempts at compilation and linking may be necessary to fully optimize the available short data area without exceeding the short data area limitations.

SUMMARY

The present disclosure relates to whole program analysis and, more particularly, short data optimization obtained through whole program analysis. In one embodiment, short data optimization is achieved by analyzing the program to estimate the size of existing short data and the size of any linkage tables, providing the size estimates to a compiler that is to compile the program, and compiling the program with the compiler in view of the size estimates such that a relatively large amount of data is allocated to a short data area.

In another embodiment, short data optimization is achieved by translating source objects of the program into intermediate objects using a compiler, providing the intermediate objects to a linker, analyzing portions of the program about which the compiler has no knowledge using the linker to estimate the size of existing short data and the size of any linkage tables, passing the intermediate objects back to the compiler, providing the size estimates the compiler, and translating the intermediate objects into real objects with the compiler in reference the size estimates generated by the linker so as to optimize utilization of a short data area.

In a further embodiment, short data optimization is achieved by translating source files of the program into intermediate objects with a compiler, providing the intermediate objects to a linker, analyzing substantially all portions of the program about which the compiler has no knowledge using the linker to estimate the size of existing short data and the size of any linkage tables, passing the intermediate objects back to the compiler, providing the size estimates the compiler via a feedback plug-in that includes interfaces that the compiler and the linker can call, translating the intermediate objects into real objects with the compiler in reference the size estimates generated by the linker, wherein the translating comprises determining the amount of short data that has already been allocated and calculating an estimated threshold for all other short data so as to utilize substantially as much of the short data area as possible, and linking the real objects using the linker to generate an executable program.

The disclosure further relates to systems for optimizing programs. In one embodiment, a system comprises compiling means for compiling the program in view of size estimates of short data and linkage tables of the program, linking means for analyzing the program to estimate the size of existing short data and the size of any linkage tables, and feedback means for providing the size estimates generated by the linking means to the compiling means for reference during compilation so that a short data area can be optimized.

In another embodiment, a system comprises a compiler configured to translate source objects of the program into intermediate objects, a linker configured to analyze portions of the program about which the compiler has no knowledge to estimate the size of existing short data and the size of any linkage tables, and a feedback plug-in that includes interfaces that can be called by the compiler and the linker, the feedback plug-in facilitating communication of the size estimates of the linker to the compiler.

In a further embodiment, a system comprises logic configured to translate source objects of the program into intermediate objects, logic configured to translate intermediate objects into real objects, logic configured to analyze the program to estimate a present consumption of a short data area, and logic configured to facilitate communication of the consumption estimate to the logic configured to translate the intermediate objects into real objects.

Furthermore, the disclosure relates to a translator/optimizer. In one embodiment, a translator/optimizer comprises a compiler configured to translate source objects of the program into intermediate objects and intermediate objects into real objects, the compiler including a short data estimator configured to estimate the size of data to be allocated to a short data area, a linker configured to analyze portions of the program about which the compiler has no knowledge to estimate the size of existing short data and the size of any linkage tables and to link real objects together to generate an executable program, the linker including a short data estimator configured to estimate the size of existing short data and linkage tables during a first pass of the linker, and a feedback plug-in that includes interfaces that can be called by the compiler and the linker, the feedback plug-in facilitating communication of the size estimates of the linker to the compiler.

Moreover, the disclosure relates to a plug-in for facilitating short data optimization. In one embodiment, the plug-in comprises a plurality of interfaces that can be called by function pointers of a compiler and a linker, a first interface facilitating communication to the compiler that a first pass of the linker has been completed to thereby indicate that whole program analysis has been performed to collect information on existing short data and linkage tables, a second interface facilitating communication to the linker to provide the collected information to the compiler, wherein the compiler can then compile the program using the information collected from the linker so as to fully utilize a short data area of the program.

DETAILED DESCRIPTION

Disclosed are systems and methods for performing whole program analysis. Through this analysis, more effective optimization of a source program can be achieved during the compilation and linking phases of the program translation process. With the disclosed systems and methods, feedback is provided from the linker to the compiler to provide the compiler with more information about the program during compilation. As is discussed in greater detail below, this feedback is made possible by the provision of a set of interfaces that permit the compiler and the linker to communicate with each other. In that the linker has access to the entire program, more effective optimization can be obtained.

In one aspect, short data optimization can be performed in that the linker has access to all program data, including that contained in all real objects, and has knowledge of the overhead (e.g., linkage tables produced by the linker) that must be taken into account in optimizing the short data area. By providing this information to the compiler, the compiler can estimate the amount of short data that already has been allocated and calculate a threshold of the remaining data to be allocated to the short data area. Through this process, the short data area can be fully utilized without exceeding its limitations, thereby resulting in a more efficient compiled program. In that this optimization is automatic, there is no need to specify initial short data thresholds or create and maintain library databases.

Although the disclosed systems and methods are described in detail, it will be appreciated that they are provided for purposes of illustration only and that various modifications are feasible without departing from the inventive concepts. After the description of the example systems, examples of operation of the systems are provided to explain the manners in which optimization can be facilitated.

Figure 1:
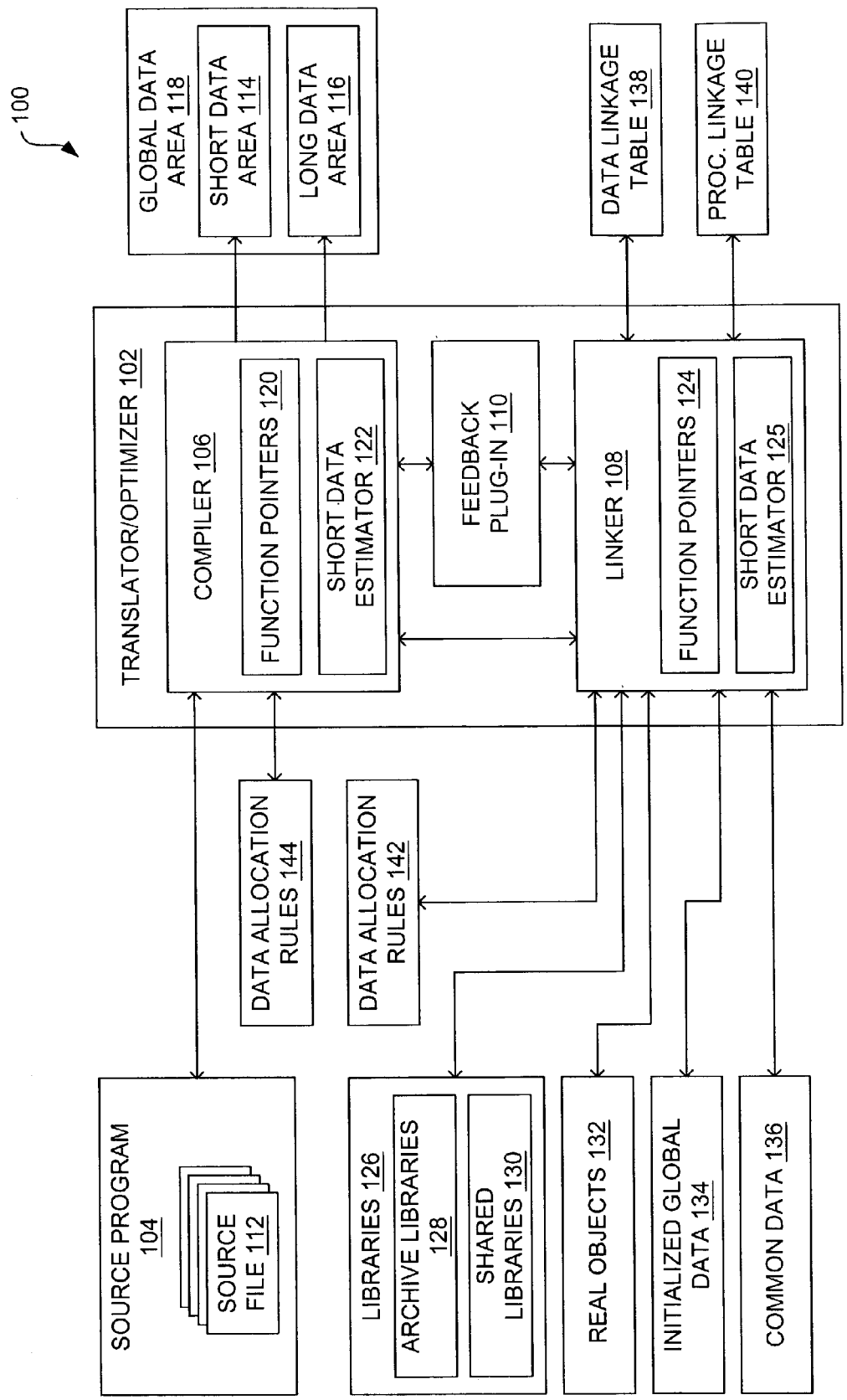
FIG. 1 is a block diagram illustrating an example system for providing whole program analysis.

With reference to FIG. 1, illustrated is an example system with which whole program analysis can be achieved. As indicated in FIG. 1, the system 100 comprises a translator/optimizer 102 that is used to translate and optimize a source program 104 into an object program in machine code. The translator/optimizer comprises a compiler 106, a linker 108, and a feedback plug-in 110, which facilitates communications between the compiler and the linker. The compiler 106 is configured to translate source files 112 of the source program 104 into intermediate objects and object files. During this compilation, various data are designated as short or long data and therefore allocated to a short data area 114 and a long data area 116, respectively, of a global data area 118. As indicated in FIG. 1, the compiler 106 includes a set of function pointers 120 that, as is discussed in greater detail below, are used to select interfaces comprised by the feedback plug-in 110 used to communicate with the linker 108.

In addition, the compiler 106 includes a short data estimator 122 that is used to estimate how much data may be allocated to the short data area 114. The estimator 122 therefore typically comprises one or more algorithms that calculate a short data estimate.

The linker 108 is configured to link the various object files compiled by the compiler 106 into an executable program. As shown in the figure, the linker 108 includes its own set of function pointers 124 that, as is discussed below, are used to select interfaces of the feedback plug-in 110 to communicate with the compiler 106. In that the linker 108 views the entire program, the linker is capable of gathering information from various sources that are unknown to or inaccessible by the compiler 106. Accordingly, the linker 106 may gather information contained within various program libraries 126 (including archive libraries 128 and shared libraries 130), real objects 132, initialized global data 134, and common data 136. Through the linking process, the linker 108 generates tables, including a data linkage table 138 and a procedural linkage table 140, that will be allocated to the short data area 114.

As is further indicated in FIG. 1, the system 100 includes data allocation rules 142 that are followed by linker 108 in gathering information about the program. In order for the compiler 106 to make proper use of the information that is provided to it by the linker 108, the compiler has its own copy of the data allocation rules 144. As depicted in the figure, these sets of rules 142, 144 may be provided separate from the linker 108 and compiler 106. Alternatively, however, they may be incorporated into the linker 108 and compiler 106, if desired.

The feedback plug-in 110 comprises a dynamically loadable library (DLL) that contains the various interfaces (application programming interfaces (APIs)) used by the compiler 106 to access the linker 108, and vice versa. The plug-in 110 is typically formed as a separate module that is dynamically loaded by the linker 108. Once loaded, the various interfaces are "hooked" into the linker 108 at strategic points during the linking process to override or supplement standard linker behavior and to permit insertion of dynamically-generated information into the linking process. During operation, the plug-in 110 can select the events it will see. As each event is delivered to the plug-in 110, the linker 108 provides a set of callback interfaces that the plug-in can use to observe or modify the current state of the linking process.

When the plug-in 110 is loaded, the linker 108 invokes an initialization routine in the plug-in. This routine registers a plug-in extension with the linker 108, selects the set of events that should be delivered, and supplies a table of pointers to functions that implement the plug-in interfaces. During the first link pass, the events that can be delivered to the plug-in include opening of an input file and closing of an input file. If the input file type is supported by the plug-in 110 rather than the linker 108, the linker delivers a "first-pass scan" event to the plug-in.

At the end of the first link pass, the linker 108 delivers an "end first pass" event to the plug-in 110. At this point, the plug-in 110 has the opportunity to contribute additional first pass data to the link. At the conclusion of the end-of-pass processing after pass 1 and immediately prior to the second link pass, the linker 108 delivers a "begin second pass" event to the plug-in 110. During the second link pass, the events that can be delivered to the plug-in 110 include opening of an input file and closing of an input file. If the input file type is supported by the plug-in 110 rather than the linker 108, the linker delivers a "second-pass scan" event to the plug-in. Finally, at the conclusion of the second pass, the linker 108 delivers an "end second pass" event to the plug-in 110.

During plug-in extension loading, the linker 108 reads a plug-in configuration file that typically comprises a simple line-oriented ASCII file that contains three fields separated by white space: a plug-in identifier, a plug-in type, and a file name. The plug-in identifier is a unique identifier associated with the plug-in 110 for use in command-line options. The plug-in type indicates how the plug-in 110 should be loaded: always, only when a command-line option invokes it, or only when an unknown input file type is encountered. The linker 108 loads the plug-in extension with an appropriate function, such as dlopen( ). The linker 108 then uses dlsym( ) to find an entry point with the name init, and calls it. This entry point can have an interface in the form: plug_in_vector_t * init(linker_vector_t *linker_vector). The types plug_in_vector_t and linker_vector_t define the tables of function pointers that are used for all interface calls from the linker 108 to the plug-in 110, and from the plug-in to the linker, respectively. The init routine returns a pointer to its plug_in_vector_t structure. The first member of this structure is a mask indicating which events should be delivered to the plug-in 110. The remainder of the members are pointers to functions that handle each event. Function pointers corresponding to nondelivered events may be NULL, and all others must be valid.

The various interfaces that may be used by the linker 108 will now be discussed. Several first-pass events interfaces can be called to deliver events that occur during the linker's first pass over the input files. In the first pass, the linker 108 collects symbol table and section size information, and it makes a preliminary scan over the relocations to collect information about short format procedure calls and references through the linkage tables. When first-pass events are delivered, error-reporting, file handle, linker symbol table, and first-pass callback interfaces are available. Just before the first pass begins, the linker 108 delivers a beginning-of-pass event to the plug-in through the pass1_begin interface: void pass1_begin( ). Whenever an input file is opened during the first pass, an event is delivered to each plug-in 110 through the pass1_open interface: void pass1_open(file_handle_t handle). The handle can be used for obtaining the file name and determining the type of input file, and it may be saved for use later in the first pass. For example, the plug-in 110 may keep a list of the handles of archive libraries, and selectively re-scan them at the end of the first pass.

If an input file is associated with the particular plug-in 110, an event is delivered to the plug-in through the pass1_scan interface: void pass1_scan(file_handle_t handle). The handle can be used for reading the contents of the file. At this point, processing for a typical object file would deliver information to the linker including, for example, central processing unit (CPU) type, revision level, and extension bits required by object code in the module; global symbols defined in and referenced by the module; names of local symbols defined in the module; names and sizes of sections in the module, with relocations for each section; and note sections. If the plug-in 110 has any object code or data to contribute to the link, it may use the callback interfaces to deliver this information in response to this event, or it may choose to wait until the end of the first pass.

Whenever an input file is closed during the first pass, an event is delivered to the plug-in 110 through the pass1_close interface: void pass1_close(file_handle_t handle). At the end of the first pass, before any between-pass processing has begun, the linker 108 delivers an end-of-pass event to the plug-in 110 through the pass1_end interface: void pass1_end( ). The plug-in 110 may at this point deliver symbol and section information to the linker 108, and it may also initiate the first-pass processing of additional object files.

Several second pass events interfaces may also be called to deliver events that occur during the linker's second pass over the input files. When second-pass events are delivered, error-reporting, file handle, linker symbol table, and second-pass callback interfaces are available. Just before the second pass begins, the linker 108 delivers a beginning-of-pass event to the plug-in 110 through the pass2_begin interface: void pass2_begin( ). Whenever an input file is opened during the second pass, an event is delivered to the plug-in 110 through the pass2_open interface: void pass2_open(file_handle_t handle). If an input file is associated with the plug-in 110, an event is delivered only to the plug-in through the pass2_scan interface: void pass2_scan(file_handle_t handle). The handle can be used for reading the contents of the file. At this point, processing for a typical object file would deliver information to the linker 108 including all local symbols defined in the module and the contents of each section in the module. If the plug-in 110 has any object code or data to contribute to the link, it may use the callback interfaces to deliver this information in response to this event, or it may choose to wait until the end of the second pass.

Whenever an input file is closed during the second pass, an event is delivered to the plug-in 110 through the pass2_close interface: void pass2_close(file_handle_t handle). At the end of the second pass, the linker 108 delivers an end-of-pass event to the plug-110 in through the pass2_end interface: void pass2_end( ). The plug-in 110 may at this point deliver local symbols and section contents to the linker 108, and may also initiate the second-pass processing of any additional object files that the plug-in introduced at the end of the first pass.

Linker callback interfaces are provided by the linker 108 for use by the plug-in extension. The callback interfaces are grouped into various sets that may be used by the plug-in 110, varied by the type of event delivered. The availability of each callback set is listed explicitly for each group of events. Linker option interfaces are available for plug-in initialization routines and argument list event handlers. A set option interface may be used to set a linker option. The effect is the same as if the given option were present on the linker command-line. This function can take the form: void set_option(char *option, char *opt_parm). The option parameter contains the option sentinel character (e.g., '−' or '+'), followed immediately by the option letter(s). If the option requires a secondary parameter, it can be given as the opt_parm parameter; otherwise, the second parameter should be NULL. If a set option interface is called to add a library search option during the handling of an input file name or input library event, the new input library name is added before (or in place of, depending on the disposition) the file name for which the event was delivered. No events are delivered to the plug-in 110 for the new file name.

An add file name interface may be used to add a new file name to the linker argument list. This may be an additional file name, or a replacement for an existing file name listed on the original command line. This interface can take the form: void set_option(char *option, char *opt_parm). If called during the handling of an input file name or input library event, the new input file name is added before (or in place of, depending on the disposition) the file name for which the event was delivered. No events are delivered to the plug-in 110 for the new file name.

Linker symbol table interfaces can also be provided to allow the plug-in 110 to make inquiries of the linker's global symbol table. A symbol table iterator interface provides sequential access to the linker symbol table. This interface can take the form: plug-in_symbol_iterator_t get_symbol_iterator( ). The iterator interface provides access to linker symbol structures which can be queried about various symbol properties such as whether a symbol is a function or a data, whether it is defined or undefined, whether it is defined statically or dynamically, whether it is a common symbol, whether it has linkage table entries, whether it has static and/or dynamic references, whether a symbol is hidden/protected/preemptible, etc. Various other interfaces can be provided. For example, an interface to inquire whether an executable or a shared library is being built and an interface to provide the size of the short data area can both be used by the plug-in 110 to perform more aggressive optimizations. Additionally, the plug-in 110 comprises a get_short_data_size( ) linker callback used by the compiler 106 to obtain the data collected by the linker 108 completes its analysis after its first pass.

Figure 2:
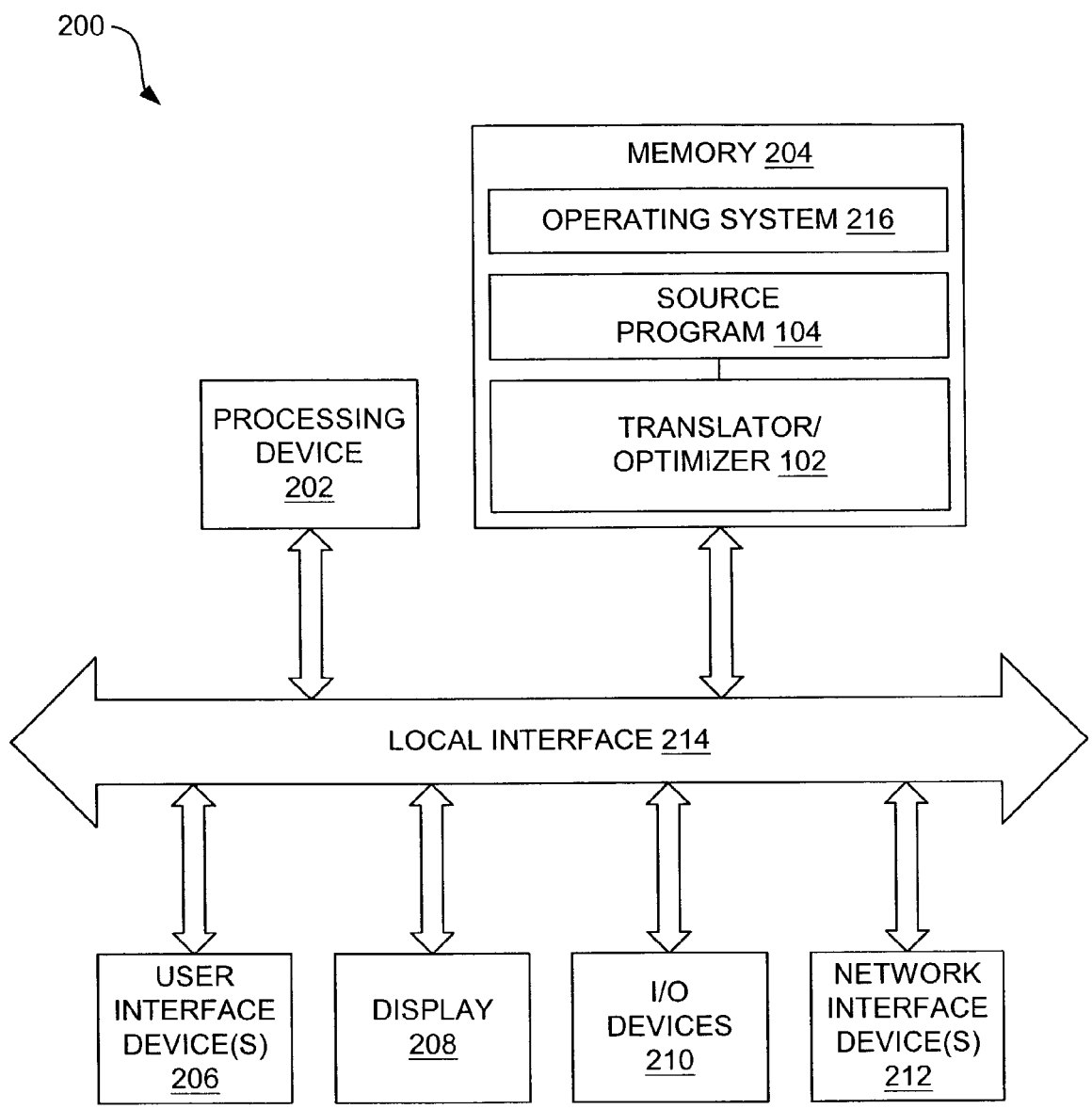
FIG. 2 is a block diagram of an example computer system on which a translator/optimizer shown in FIG. 1 can be executed.

FIG. 2 is a schematic view illustrating an example architecture for a computer system 200 on which the translator/optimizer 102 can execute. Generally speaking, the computer system 200 can comprise any one of a wide variety of wired and/or wireless computing devices, such as a desktop computer, portable computer, dedicated server computer, multi-processor computing device, cellular telephone, personal digital assistant (PDA), handheld or pen-based computer, and so forth. Irrespective its specific arrangement, the computer system 200 can, for instance, comprise a processing device 202, memory 204, one or more user interface devices 206, a display 208, one or more input/output (I/O) devices 210, and one or more networking devices 212, each of which is connected to a local interface 214.

The processing device 202 can include any custom made or commercially available processor, a CPU or an auxiliary processor among several processors associated with the computer system 200, a semiconductor based microprocessor (in the form of a microchip), a macroprocessor, one or more application-specific integrated circuits (ASICs), a plurality of suitably configured digital logic gates, and other well known electrical configurations comprising discrete elements both individually and in various combinations to coordinate the overall operation of the computing system.

The memory 204 can include any one of a combination of volatile memory elements (e.g., random access memory (RAM, such as DRAM, SRAM, etc.)) and nonvolatile memory elements (e.g., ROM, hard drive, tape, CDROM, etc.). The memory 204 typically comprises an O/S 216, the source program 104, and the translator/optimizer 102, which has already been described in detail. Persons having ordinary skill in the art will appreciate that the memory 204 can comprise other components which have been omitted for purposes of brevity.

The one or more user interface devices 206 comprise those components with which the user can interact with the computing system 200. For example, where the computing system 200 comprises a personal computer (PC), these components can comprise a keyboard and mouse. Where the computing system 200 comprises a handheld device (e.g., PDA, mobile telephone), these components can comprise function keys or buttons, a touch-sensitive screen, a stylus, etc. The display 208 can comprise a computer monitor for a PC or a liquid crystal display (LCD) for a handheld device.

With further reference to FIG. 2, the one or more I/O devices 210 are adapted to facilitate connection of the computing system 200 to another system and/or device and may therefore include one or more serial, parallel, small computer system interface (SCSI), universal serial bus (USB), IEEE 1294 (e.g., Firewire™), and/or personal area network (PAN) components. The network interface devices 212 comprise the various components used to transmit and/or receive data over a network. By way of example, the network interface devices 212 include a device that can communicate both inputs and outputs, for instance, a modulator/demodulator (e.g., modem), wireless (e.g., radio frequency (RF)) transceiver, a telephonic interface, a bridge, a router, network card, etc.

Various software and/or firmware has been described herein. It is to be understood that this software and/or firmware can be stored on any computer-readable medium for use by or in connection with any computer-related system or method. In the context of this document, a computer-readable medium denotes an electronic, magnetic, optical, or other physical device or means that can contain or store a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

The general nature of the system 100 having been described above, an example of operation of the system will now be discussed with reference to FIGS. 3 and 4. In describing this operation, flow diagrams are provided. It is to be understood that any process steps or blocks in this disclosure represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

Figure 3:
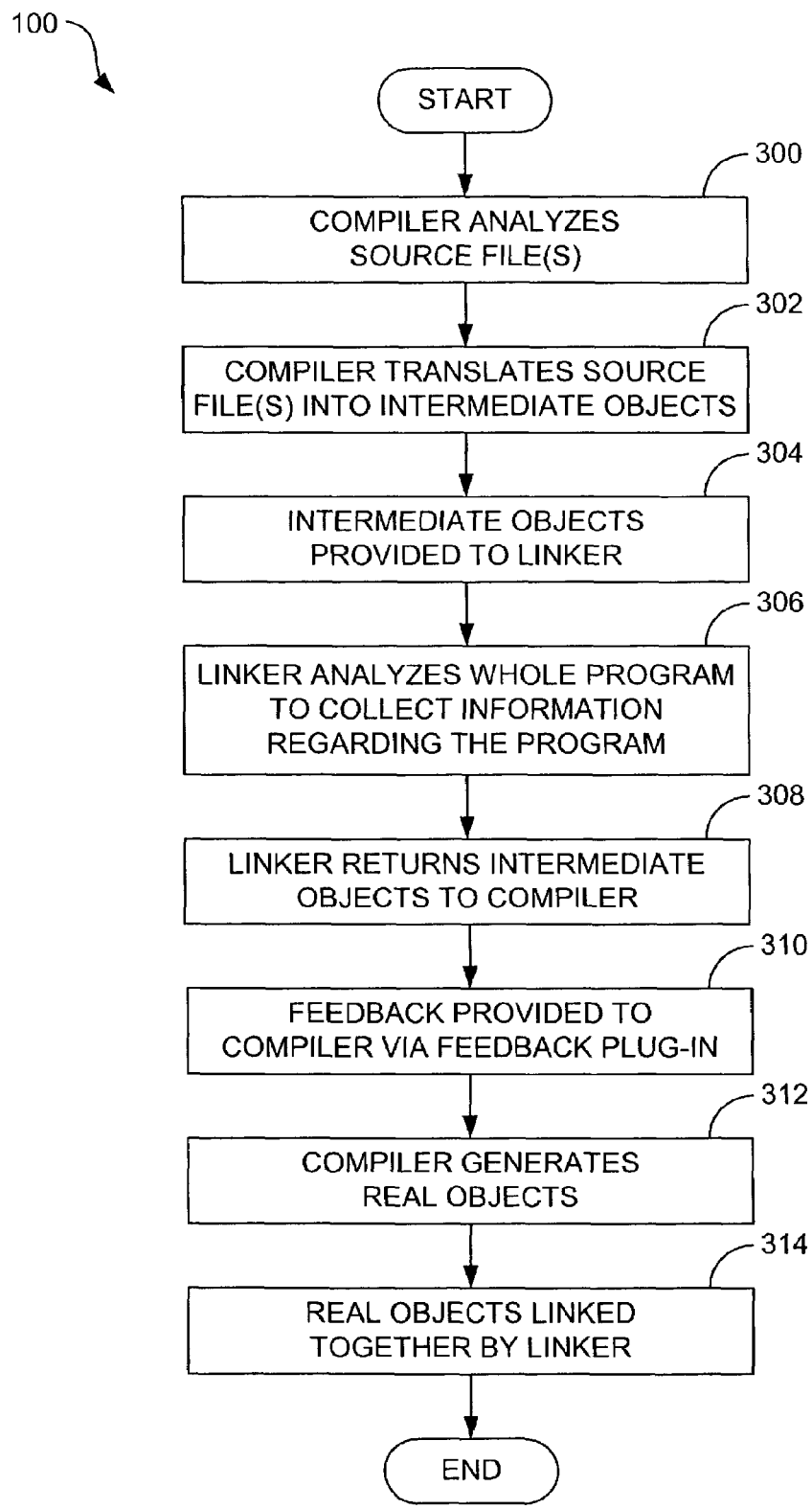
FIG. 3 is a flow diagram that illustrates an example of operation of the translator/optimizer in compiling and optimizing a source program.

FIG. 3 illustrates a high-level example of operation of the translator/optimizer 102 in providing whole program analysis. Beginning with block 300, the compiler 106 analyzes the source files 112 that have been provided to the compiler for compilation. Through this analysis, the compiler 106 translates the source files 112 into intermediate objects, as indicated in block 302, and these intermediate objects are provided to the linker 108, as indicated in block 304. The linker 108 analyzes the whole program including the intermediate objects, all libraries, real objects, initialized global data, and common data to collect information about the program that will be provided to the compiler 106 so that the program can be optimized in some manner during the final compilation process.

Next, with reference to block 308, the linker 108 returns the intermediate objects to the compiler 106, and, as indicated in block 310, feedback is provided to the compiler via the feedback plug-in 110, the feedback comprising at least part of the information gleaned by the linker during the analysis conducted in block 306. Once this feedback has been provided to the compiler 106, the compiler completes the translation of the intermediate objects to generate real objects, as indicated in block 312. At this point, the real objects are linked together by the linker 108 to produce an executable program, as indicated in block 314.

Figure 4A:
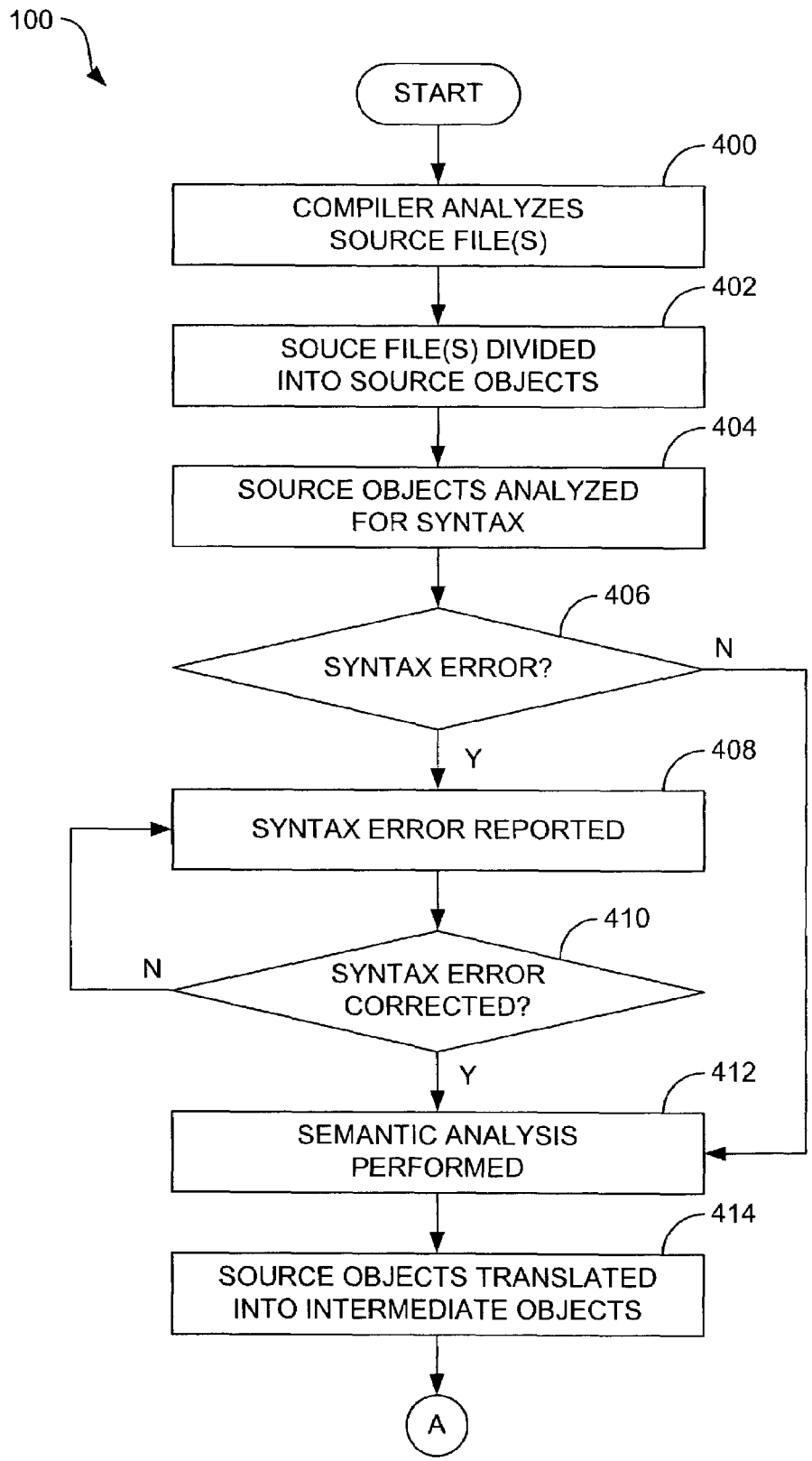
FIGS. 4A-4C provide a flow diagram that illustrates an example of operation of the translator/optimizer in compiling and short data optimizing a source program.
Figure 4B:
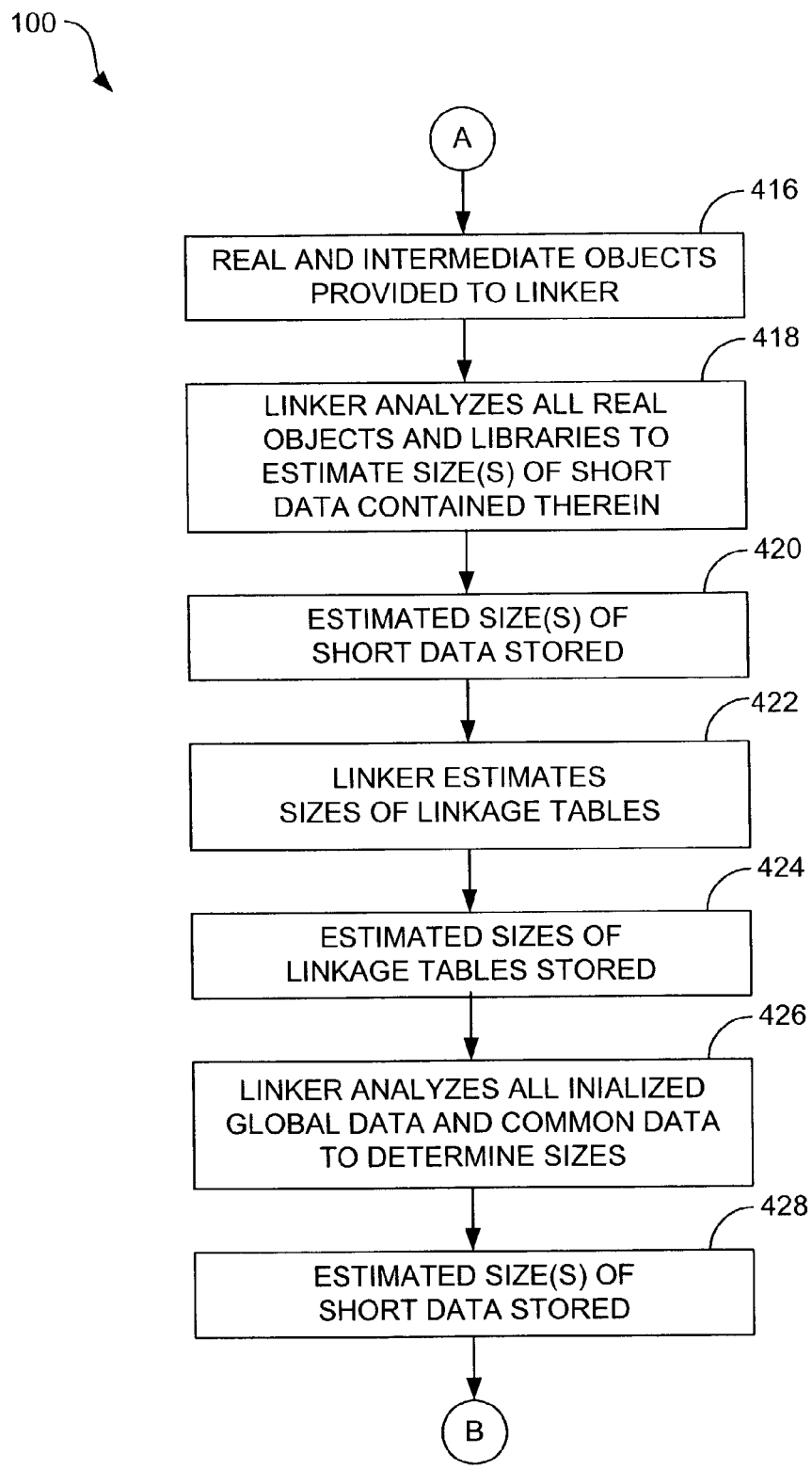

FIG. 4 provides a more detailed example of operation of the translator/optimizer 102 in providing whole program analysis. More particularly, FIG. 4 provides an example of the translator/optimizer 102 in providing short data optimization through whole program analysis. Beginning with block 400 of FIG. 4A, the compiler 106 first analyzes source files 112 so as to divide the source files into various source objects, as indicated in block 402, and classifies them as operators, constants, separators, or identifiers. Next, with reference to block 404, the compiler 106 analyzes the source objects for syntax. During this process, the grammatic structure of the program is analyzed to determine if it contains any syntax errors, and the various source objects are arranged into a syntax tree to denote the program's syntactic structure.

With reference to decision block 406, if no syntax errors are detected by the compiler 106, flow continues down to block 412 described below. If, on the other hand, one or more syntax errors are detected, flow continues to block 408 at which the syntax errors are reported to the user so that they may be corrected. With regard to decision block 410, if the syntax errors are corrected, flow continues to block 412; otherwise flow returns to block 408 at which the remaining (or any new) syntax errors are reported. At block 412, the compiler 106 performs semantic analysis on the source objects during which one or more flow graphs, call graphs, and tables may be generated.

The compiler 106 next translates the source objects into an intermediate representation to produce intermediate objects, as indicated in block 414. With reference to block 416 of FIG. 4B, the real and intermediate objects are then provided to the linker 108. Of these objects, only the intermediate objects are provided, and therefore known, by the compiler 106. The linker 108, and more particularly the linker short data estimator 125, then analyzes all libraries 126 (including archive and shared libraries 128 and 130) and all real objects 132 to determine the size of any short data contained therein, as indicated in block 418. Notably, a single short data estimate or separate short data estimates may be generated. Once this has been accomplished, the estimated size(s) of these data can be stored, as indicated in block 420. Next, with reference to block 422, the linker 108 estimates the sizes of the linkage tables. To accomplish this, the linker 108 determines if a linkage table entry is needed by a certain symbol based on several factors, such as symbol preemptability and types of references to that symbol. The size of a linkage table then is calculated by multiplying the number of entries in the table by the entry size. These linkage tables include the data linkage table 138, which will be stored in the short data area 114 and used to access long data and any preemptable data, and the procedure linkage table 140, which will also be stored in the short data area and will be used to access function calls that are contained in separate load modules. The sizes of these linkage tables are then stored by the linker 108, as indicated in block 424. Referring next to block 426, the linker 108 analyzes all initialized global data 134 and all common data 136 to estimate the size(s) of short data contained therein. Again, in block 428, the estimated size(s) of the data is stored.

Figure 4C:
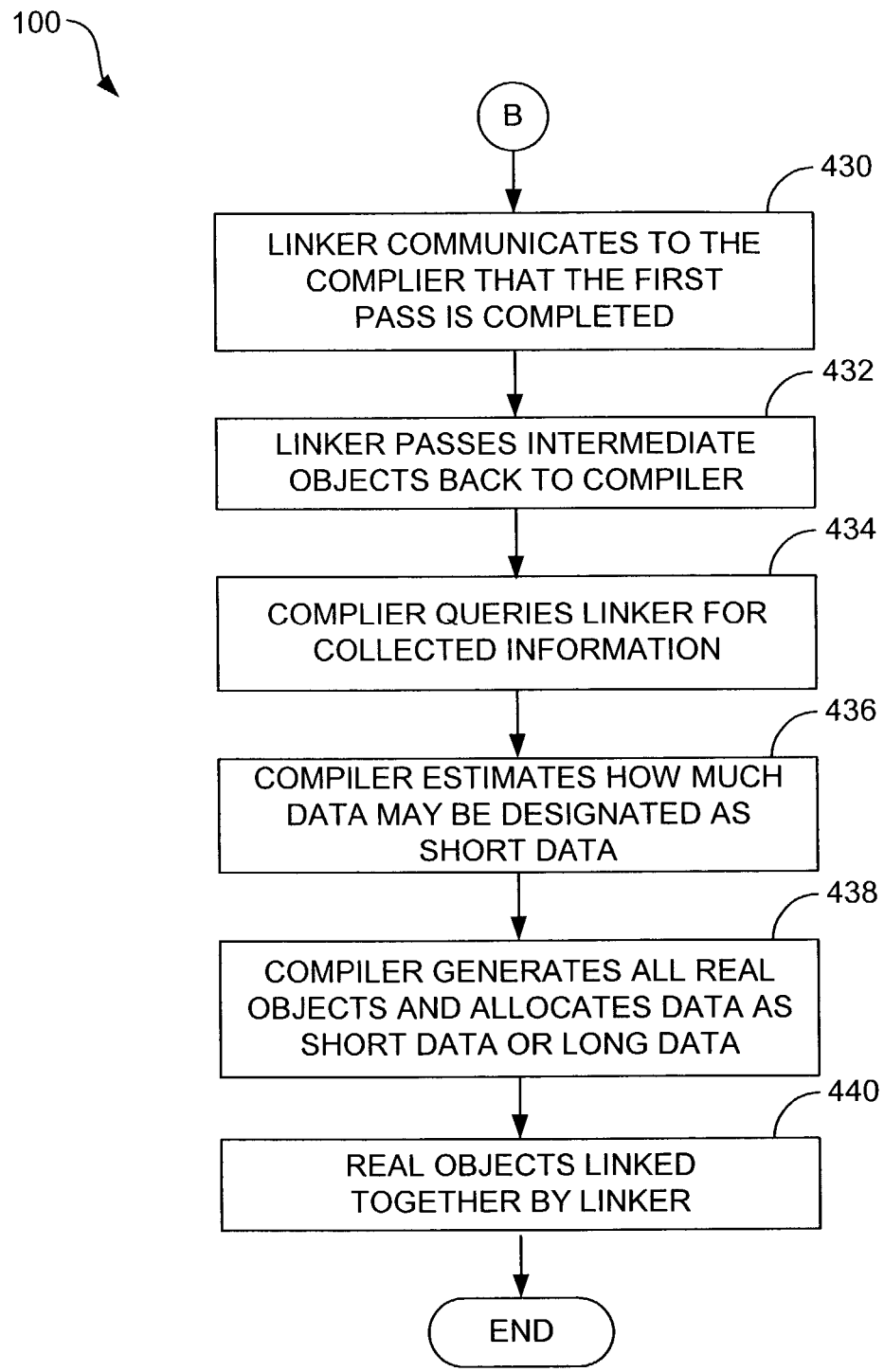

Referring now to block 430 of FIG. 4C, the linker 108 communicates to the compiler 106, via the feedback plug-in 110, that the first pass analysis is complete, thereby indicating that the whole program analysis has been conducted and that various pieces of information regarding the whole program are available to the compiler for use in the final phase of program compilation. Once this communication has been sent by the linker 108, the linker passes the intermediate objects to the compiler 106, as indicated in block 432, and, when the information collected by the linker is needed, the compiler 106 queries the linker for the various information, as indicated in block 434. In particular, the compiler 106 calls the get_short_data_size( ) linker callback of the plug-in 110 using the compiler function pointers 120 to obtain the short data information.

Next, in block 436, the compiler 106 estimates how much data may be designated as short data in view of the short data and linkage table size estimates made by the linker 108. In particular, the compiler 106 determines the amount of the short data area 114 that has already been consumed and then calculates, using the compiler short data estimator 122, an estimated threshold for all other short data so as to utilize as much of the short data area as possible. As noted above, this threshold is calculated with reference to the data allocation rules 144 so that the information provided by the linker 108 is properly evaluated. These rules may include rules as to when the linker 108 allocates linkage tables, how the linker lays out common data, what algorithm the linker uses to determine the size of the linkage tables, etc. Through this process, more data will be designated as short data than in previous solutions due to the feedback provided by the linker 108 after it conducts its whole program analysis.

With reference then to block 438, the compiler 106 generates all real objects and allocates data as short data or long data. Once all the real objects have been generated, they are then be linked together by the linker 108, as indicated in block 440, to produce an executable, short data optimized program. In that a greater amount of the short data area 114 is utilized due to the performed optimization, the resultant program can be executed with greater speed.

Figure 5:
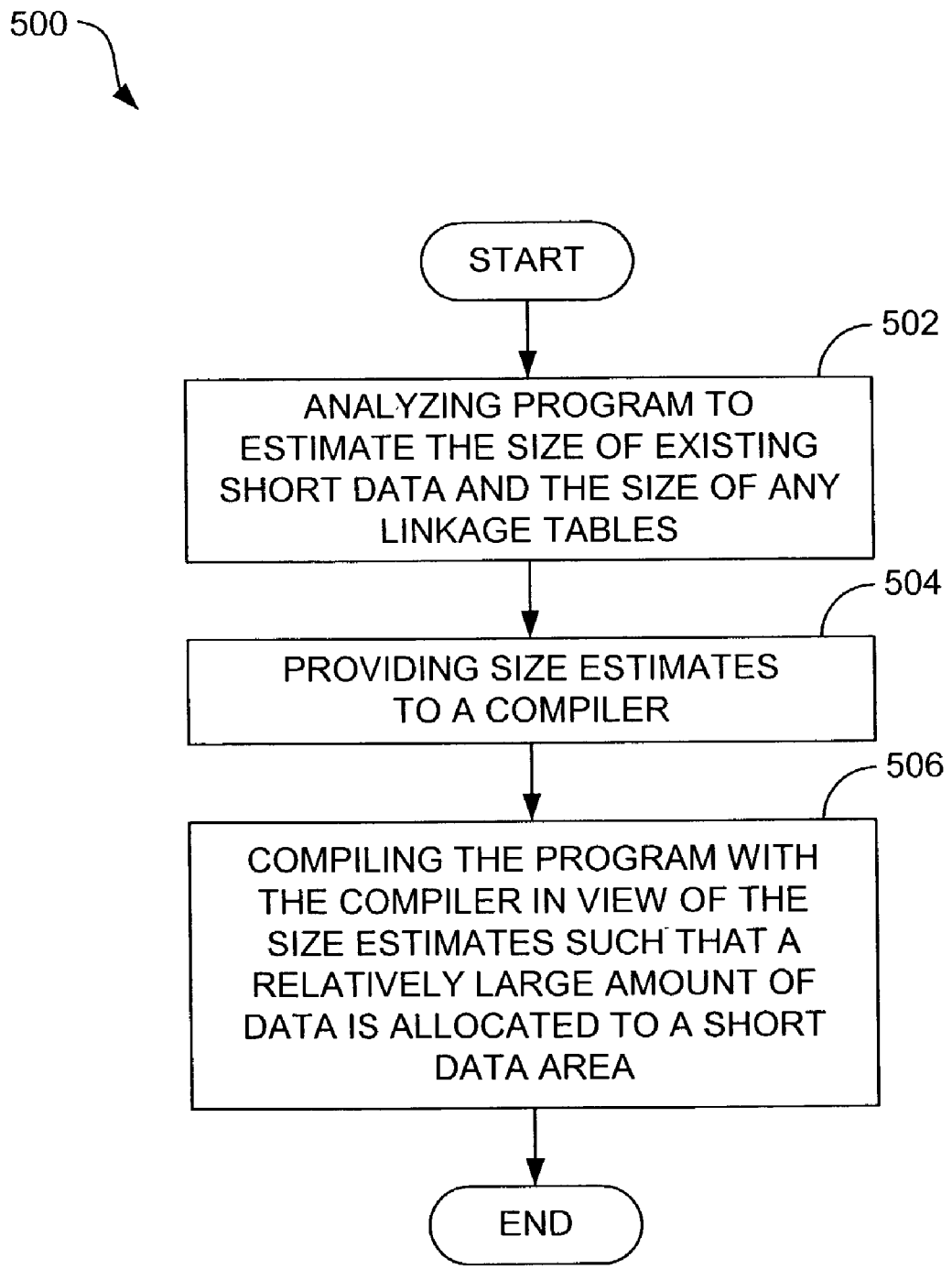
FIG. 5 is a flow diagram that illustrates a method for optimizing a program.

A program optimization method is summarized in the flow diagram 500 of FIG. 5. As indicated in this figure, an optimization method comprises analyzing a program to estimate the size of existing short data and the size of any linkage tables (502), providing the size estimates to a compiler that is to compile the program (504), and compiling the program with the compiler in view of the size estimates such that a relatively large amount of data is allocated to a short data area (506).

The invention claimed is:

1. A method for short data optimizing a program, comprising:
   translating source objects of the program into intermediate objects using a compiler;
   providing the intermediate objects to a linker;
   analyzing with the linker portions of the program about which the compiler has no knowledge to estimate the size of existing short data and the size of any linkage tables;
   passing the intermediate objects back to the compiler;
   providing the size estimates to the compiler via a feedback plug-in comprising interfaces that are called by the compiler and the linker; and
   translating the intermediate objects into real objects with the compiler in reference to the size estimates generated by the linker so as to optimize utilization of a short data area.

2. The method of claim 1, wherein the portions include at least one of libraries, real objects, initialized global data, and common data.

3. A method for compiling a program so as to short data optimize the program, comprising:
   translating source files of the program into intermediate objects with a compiler;
   providing the intermediate objects to a linker;
   analyzing with the linker substantially all portions of the program about which the compiler has no knowledge to estimate the size of existing short data and the size of any linkage tables;
   passing the intermediate objects back to the compiler;
   providing the size estimates to the compiler via a feedback plug-in that comprises a dynamically-loaded library that includes application programming interfaces (APIs) that the compiler and the linker call;
   translating the intermediate objects into real objects with the compiler in reference to the size estimates generated by the linker, wherein the translating comprises determining the amount of short data that has already been allocated and calculating an estimated threshold for all other short data so as to utilize substantially as much of the short data area as possible; and
   linking the real objects using the linker to generate an executable program.

4. The method of claim 3, wherein the portions include each of libraries, real objects, initialized global data, and common data.

5. A system for optimizing a program, comprising:
   compiling means for compiling the program in view of size estimates of short data and linkage tables of the program;
   linking means for analyzing the program to estimate the size of existing short data and the size of any linkage tables about which the compiling means has no knowledge; and
   feedback means comprising interfaces that are called by the compiling means and the linking means for providing the size estimates generated by the linking means to the compiling means for reference during compilation so that a short data area is optimized by the compiling means relative to short data about which the compiling means had no knowledge.

6. The system of claim 5, wherein the feedback means comprises a feedback plug-in.

7. A system stored on computer readable memory for optimizing a program, comprising:

a compiler configured to translate source objects of the program into intermediate objects;

a linker configured to analyze portions of the program about which the compiler has no knowledge to estimate the size of existing short data and the size of any linkage tables; and a feedback plug-in that includes interfaces that are called by the compiler and the linker, the feedback plug-in facilitating communication of the size estimates of the linker to the compiler for reference during compilation so that a short data area is optimized by the compiler relative to information about the existing short data and linkage tables.

8. The system of claim 7, wherein the compiler is further configured to translate intermediate objects into real objects.

9. The system of claim 7, wherein the compiler comprises a short data estimator configured to estimate the size of data to be allocated to a short data area.

10. The system of claim 7, wherein the compiler comprises a function pointer that is configured to call an interface of the feedback plug-in to request short data and linkage table size estimates.

11. The system of claim 7, wherein the linker is further configured to link real objects together to generate an executable program.

12. The system of claim 7, wherein the linker comprises a short data estimator configured to estimate the size of existing short data and linkage tables during a first pass of the linker.

13. The system of claim 7, wherein the linker comprises a function pointer that is configured to call an interface of the feedback plug-in to signal completion of a first pass.

14. A translator/optimizer stored on computer readable memory, comprising:

a compiler configured to translate source objects of the program into intermediate objects and intermediate objects into real objects, the compiler including a short data estimator configured to estimate the size of data to be allocated to a short data area;

a linker configured to analyze portions of the program about which the compiler has no knowledge to estimate the size of existing short data and the size of any linkage tables and to link real objects together to generate an executable program, the linker including a short data estimator configured to estimate the size of existing short data and linkage tables during a first pass of the linker; and a feedback plug-in that includes interfaces that are called by the compiler and the linker, the feedback plug-in facilitating communication of the size estimates of the linker to the compiler for reference during compilation so that a short data area is optimized by the compiler relative to the linker size estimates.

15. The translator/optimizer of claim 14, wherein the compiler further comprises a function pointer that is configured to call an interface of the feedback plug-in to request short data and linkage table size estimates.

16. The translator/optimizer of claim 14, wherein the linker further comprises a function pointer that is configured to call an interface of the feedback plug-in to signal completion of a first pass.

17. A plug-in stored on computer-readable memory, the plug-in comprising:

a plurality of interfaces that are called by function pointers of a compiler and a linker, a first interface facilitating communication to the compiler that a first pass of the linker has been completed to thereby indicate that whole program analysis has been performed to collect information on existing short data and linkage tables, a second interface facilitating communication to the linker to provide the collected information to the compiler;

wherein the whole program analysis includes an analysis of portions of the program about which the compiler has no knowledge;

wherein the collected information includes estimates of the sizes of the existing short data and linkage tables: and wherein the compiler then compiles the program using the information collected from the linker so as to fully utilize a short data area of the program.

* * * * *

UNITED STATES PATENT AND TRADEMARK OFFICE
CERTIFICATE OF CORRECTION

PATENT NO. : 7,275,242 B2 Page 1 of 1
APPLICATION NO. : 10/264681
DATED : September 25, 2007
INVENTOR(S) : Shin-Ming Liu et al.

It is certified that error appears in the above-identified patent and that said Letters Patent is hereby corrected as shown below:

In column 12, line 66, in Claim 7, delete "computer readable" and insert -- computer-readable --, therefor.

In column 13, line 33, in Claim 14, delete "computer readable" and insert -- computer-readable --, therefor.

In column 14, line 36, in Claim 17, after "tables" delete ":" and insert -- ; --, therefor.

Signed and Sealed this

Fifteenth Day of July, 2008

JON W. DUDAS
*Director of the United States Patent and Trademark Office*